United States Patent [19]

Mahler

[11] Patent Number: 4,722,139

[45] Date of Patent: Feb. 2, 1988

[54] HAND-HELD WILD-SEED REAPING APPARATUS AND METHOD

[76] Inventor: David Mahler, 4602 Placid Pl., Austin, Tex. 78731

[21] Appl. No.: 920,378

[22] Filed: Oct. 20, 1986

[51] Int. Cl.4 ............................................... B25F 1/00
[52] U.S. Cl. ........................................ 30/124; 30/276; 56/202
[58] Field of Search ................... 56/16.6, 202; 30/276, 30/286, 289, 292–294, DIG. 5, 124

[56] References Cited

U.S. PATENT DOCUMENTS 3,047,998  8/1962  Leader et al. ........................ 56/202
3,353,268  11/1967  Meltzer ................................. 30/276

Primary Examiner—Douglas D. Watts
Attorney, Agent, or Firm—John Nevin Shaffer, Jr.

[57] ABSTRACT

A hand-held wild-seed reaping apparatus and method having a motor mounted on a frame for driving a cutting mechanism which is surrounded by a containment box with an open front and rear end. A cutting collector attached to the open rear end of the containment box is provided to retain cut seed which has been selected by the user for harvesting and which is removably attached to the frame of the invention. As a result, users can harvest seed wherever walking is possible, even in steep, rocky or brushy territory. Further, they are enabled to be very selective in cutting, therefore harvesting only selected species and avoiding unwanted species.

4 Claims, 4 Drawing Figures

HAND-HELD WILD-SEED REAPING APPARATUS AND METHOD

BACKGROUND OF THE INVENTION

This invention relates to an improved hand-held wild-seed reaping and cutting collecting apparatus and method for the harvesting and collection of wild-grown seed.

There are two main methods for harvesting wild seed in existence today. The first method, and the one most widely used, is hand harvesting. When the seed to be harvested is plentiful, adequate amounts of seed can be harvested in a reasonable amount of time. The disadvantage of this method is that the work is tedious and can subject the harvester to back soreness from stooping and cut hands from the harvesting itself. Further, hand harvesting is only an adequate solution for the small to very small size projects.

The second method for harvesting wild seed is through the utilization of machinery. In wide, flat areas free of large rocks, brush, and non-native plants, farm equipment has been used for wild-seed harvesting. An example of a farm harvesting machine is disclosed in Bodine U.S. Pat. No. 3,597,906 which discloses a threshing device whereby grain is removed from the stock by means of sonic vibrations.

Another technique utilizing machinery that is useful in harvesting flat areas is a "bumper gatherer" which is a modified bag attached to the front bumper of a pickup truck. The truck is simply driven across the field and wild seed is hopefully deposited in the bag attached to the front bumper. Obviously, a lawn mower with a grass catcher attached to it would also be useful in flat, obstruction-free areas for the few species that are only several inches high.

Unfortunately, almost all of the flat lands of the United States have been farmed, whether they be by wide mesas or river bottoms or elsewhere. Abandoned farm land is usually dominated by pest species such as Johnson, Bermuda and exotic brome grasses. Further, most flat remnants of high quality native prairie habitat discovered in the United States are probably significant enough that they have been acquired for protection. In any event, it is obvious that the usefulness of farm equipment or typical mechanical means for harvesting wild seed is severely limited. The other drawback is that previous devices, other than hand harvesting, do not provide for selectivity in harvesting nor enable the operator to travel to steep, rocky or brushy territory to harvest seeds appropriate for those particular types of landscapes or to simply obtain seeds in these locations that have been spared harvesting by simpler methods.

Thus, there is a need in the art for providing a hand-held wild-seed reaping device which effectively gathers wild seed in areas where wild seed is most prominently available. It, therefore, is an object of this invention to provide an improved hand-held wild-seed reaping device that enables the user to harvest seed wherever walking is possible, even in steep, rocky or brushy territory. Further, it is an object of this invention to provide a means whereby harvesting of only especially desired or specifically selected species is enabled and avoidance of unwanted species is provided. Still further, it is an object of this invention to provide an efficient means for harvesting of single species in large colonies. A further object of this invention is to provide a device with the capacity to harvest a wide assortment of seed so that, when used in a diverse habitat, the harvest can emulate the variety of species which are producing seed at a specific time of year. Further, this device can be utilized during traditional household and landscape uses of string line cutters to catch and gather the cuttings during operation.

SHORT STATEMENT OF THE INVENTION

Accordingly, the hand-held wild-seed reaping device of the present invention includes a frame having a motor mounted on the frame, either electric or, more usefully, gasoline or some other fuel source such as gasoline, for powering a cutting mechanism. The cutting mechanism may be of any acceptable variety such as a blade or a monofilament "string" cutter, as it is commonly known in the art. A containment means is attached around the cutting blade and provides an open-ended entrance for cut seed and clippings to enter the device. The containment means has an open back end around which is attached a removably attachable cutting collector in the form of a cloth bag or sack. The cloth bag has an open end to receive cut seed from the back of the containment means and a closeable end closed with a draw string which is suspended from the frame of the device.

As a result, a light weight, versatile, infinitely variable wild-seed reaping device is provided.

BRIEF DESCRIPTION OF THE DRAWINGS

Other objects, features and advantages of the present invention will become more fully apparent from the following detailed description of the preferred embodiment, the appended claims and the accompanying drawings in which:

Referring to FIG. 1, device 10 is shown composed of a frame 12, a motor 14 (shown in FIG. 2) mounted on one end of frame 12 and a cutting means 16 attached to the opposite end of frame 12. Containment means 18 is attached to frame 12 by bolts 20 or any other conventional means. Containment means 18 has openings in the front end 22 and the rear end 24.

FIG. 1 also shows removably attachable cutting collector 26, attached to and covering rear open end 24 of containment means 18. Also shown are support handle 28 and string trimmer 30.

FIGS. 1 and 2 also demonstrate the components of containment means 18 comprised of flat bottom section 32, short perpendicular side 34 attached by conventional means to flat bottom section 32, long perpendicular side 36 similarly attached to flat bottom section 32 and multi-level top section 38 connecting both short and long perpendicular sides 34 and 36. Multi-level top section 38 is comprised of lower level 40, transition section 42 and upper level 44.

Referring now to FIGS. 3 and 4, strength member 46 is attached to the forward edge of the front open end 22 of containment means 18. Raised retention rails 48 are attached to the rear open end 24 of containment means 18 so that said retention rails 48 provide a means for receiving and retaining cutting collector 26. Removably attachable cutting collector 26 may incorporate an elastic drawstring, not shown, for placement around the rear open end 24 so that the open end of the cutting collector 26 can be attached to and held in place by the combination of raised retention rails 48 and the elastic drawstring means. As clearly shown in FIGS. 3 and 4, removably attachable cutting collector 26 has an open end 50 which is attached around raised retention rails 48. Also, cutting collector 26 has a closeable end closed with a drawstring (not shown) 52 to which one end of attaching means 54 is connected. The other end of attaching means 54 is removably attachable to frame 12 by use of hook 56 and eyelet 58 wherein eyelet 58 is attached permanently to frame 12.

Figure 1:
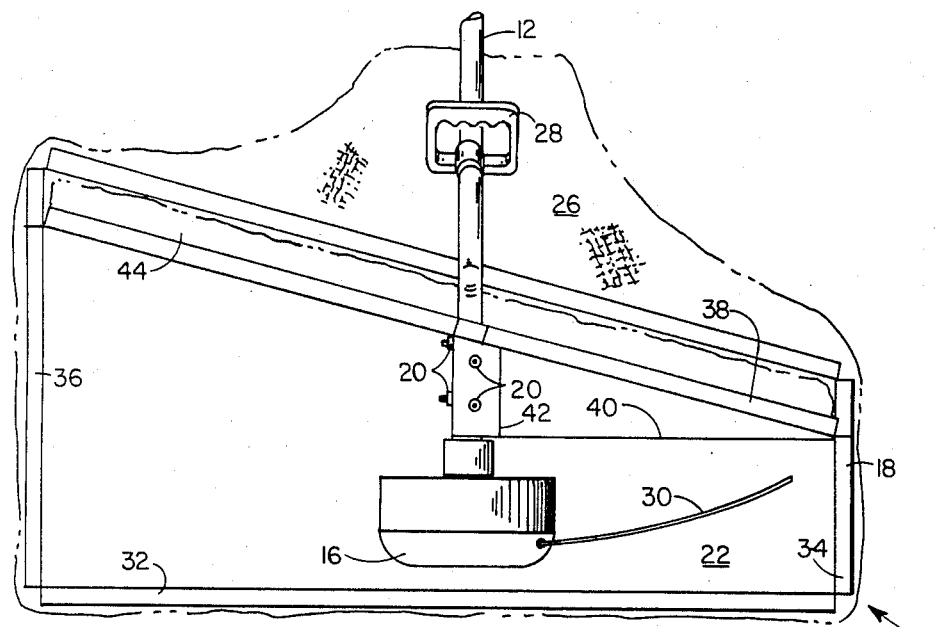
FIG. 1 is a front view of the device.
Figure 2:
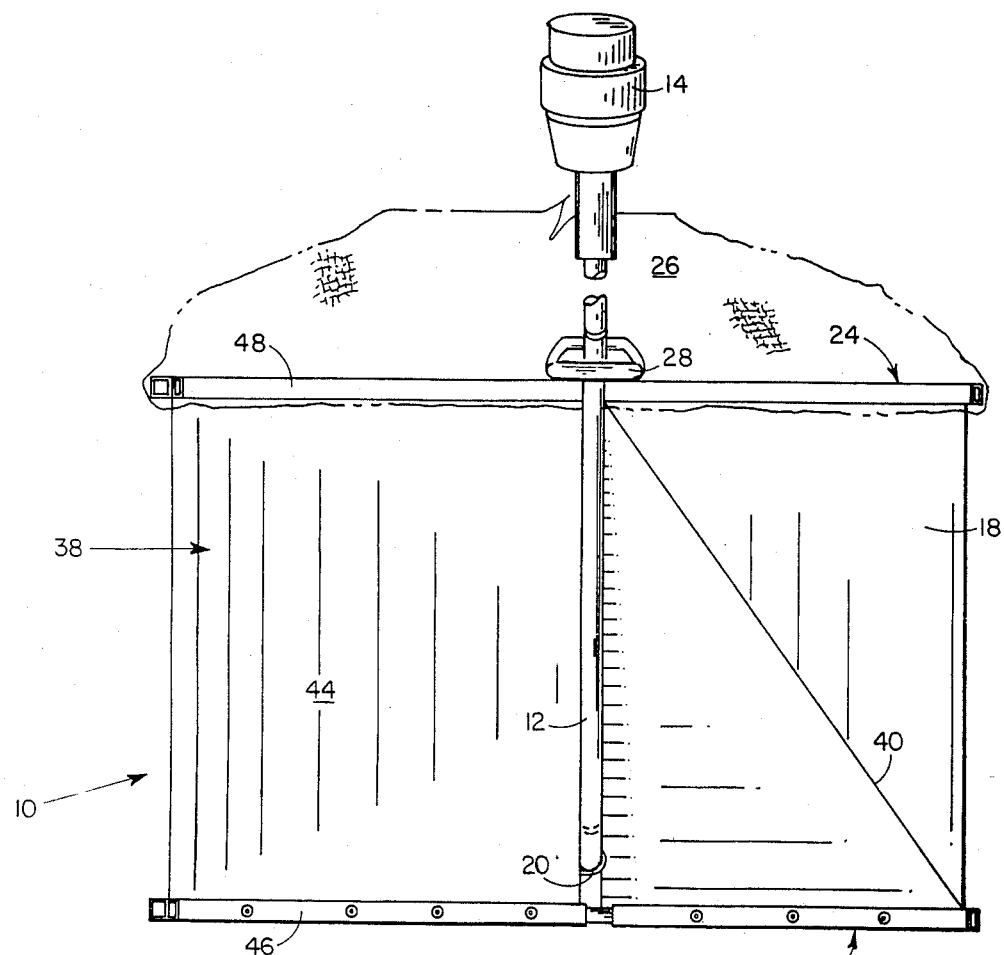
FIG. 2 is a top view of the device.
Figure 3:
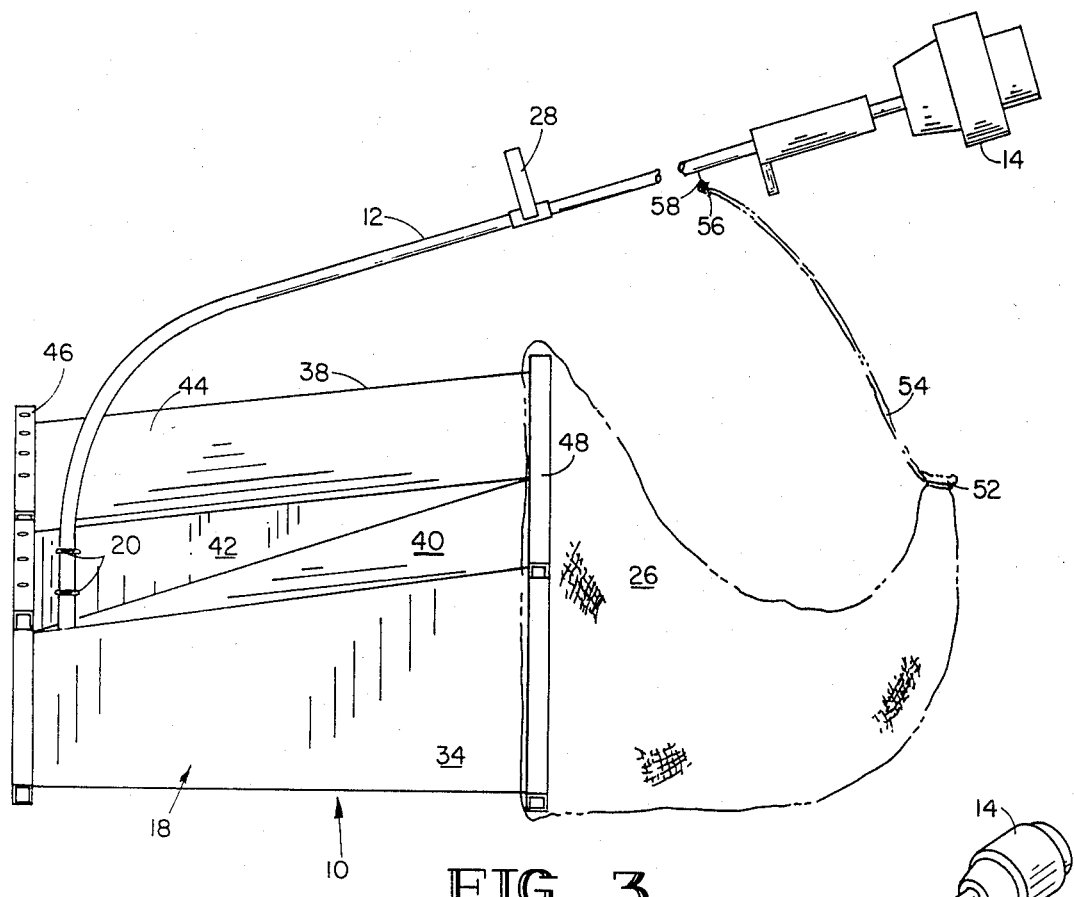
FIG. 3 is a side view of the device.
Figure 4:
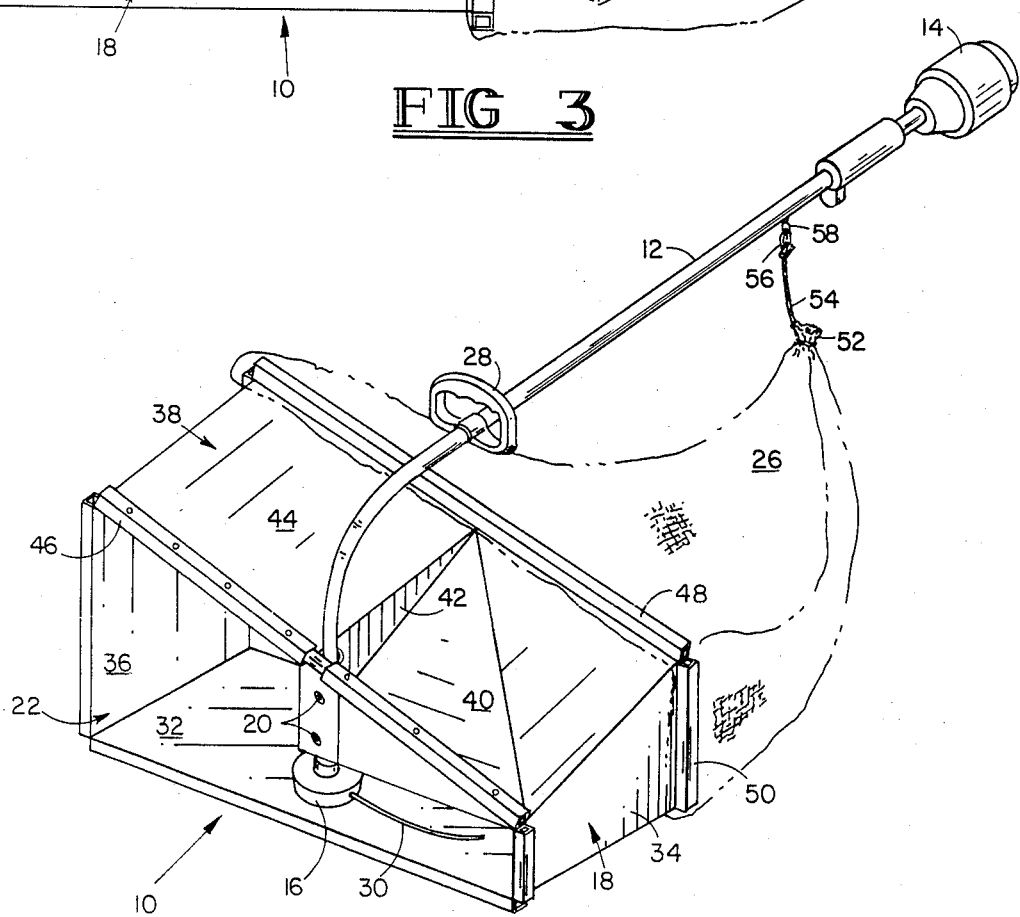
FIG. 4 is a perspective view of the device.

In operation, device 10 is utilized by grasping support handle 28, starting motor 14, a gasoline, electric or any other conventional powering means, and directing cutting means 16 so that string trimmer 30 comes into contact with and subsequently cuts the desired plant parts containing wild seeds at the direction of the user. Containment means 18 ensures that a wide scope of wild seeds may be introduced to the mouth of device 10. Strength member 46 ensures that the device can withstand the shoving and pushing necessary to force the device into contact with the seeds to be collected without deforming containment means 18. The unique multi-level top section 38 ensures that a large opening is provided on the side of the device where the wild seeds would be thrown once cut while a small side is provided on the side prior to cutting. Frame 12 is simply and securely connected to containment means 18 by means of connecting bolts 20 as shown in FIGS. 1, 3, and 4. As a result of this simple means for connection, the device may be dis-assembled for transport, repair or replacement simply and easily.

Raised retention rails 48 are provided to the rear open end 24 of containment means 18 and provide a dual purpose. They add rigidity similar to the strength members 46 while at the same time providing a secure grasping means for the open end 50 of removable attachable cutting collector 26. Cutting collector open end 50 is, in the preferred embodiment, equipped with an elastic retention means which can be drawn over raised retention rails 48 and allowed to retract to a more closed position so that cutting collector 26 has its open end 50 held securely in place onto containment means 18. As a result, seeds which are collected and cut are passed through containment means 18 and into the wide opening of cutting collector 26.

As disclosed, cutting collector 26 has an opposite closeable end closed with a drawstring 52 to which is attached attaching means 54. Closeable end 52 of cutting collector 26 is opened with a drawstring to empty, and kept closed during operation. The front end of the cutting collector 26 can be attached semi-permanently to containment means 18. Attaching means 54 is also attached at its opposite end by means of hook 56 and eyelet 58 on frame 12 to frame 12. As a result, when in use, cutting collector 26 is supported by frame 12 and is not allowed to drape or scuff along on the ground. Once cutting collector 26 is sufficiently full, hook 56 may be removed from eyelet 58. Then, as previously stated, detachable closeable end 52 of cutting collector 26 is opened by loosening the drawstring. The contents are then dumped into a container while front end of cutting collector 26 is still attached to containment means 18. If necessary, attaching means 54, in the form of a nylon cord or chain or some other suitable connector, can be utilized to wrap around open end 50 so that cutting collector 26 can be carried by hand to the deposit site for the seeds.

As a result, device 10, as shown in FIGS. 1 through 4, enables an individual to go where typical farm harvesting machines are unable to go for the collection of a wide variety and quantity of wild seeds. The device is portable, lightweight, easily assembled and dis-assembled and provides a quantum leap in the art of wild seed collecting and, as a result, in the enhanced ability for providing wild seed replacements in areas disturbed by man or nature.

What is claimed is:

1. A hand-held cuttings collector comprising:
   A. a frame;
   B. a motor mounted on said frame;
   C. a cutting means mounted on the opposite end of said frame from said motor;
   D. a containment means attached around said cutting means open at a front end and a back end;
   E. said containment means further comprising a flat bottom section connected on one side to a short perpendicular side section and on the other side to a long perpendicular side section;
   F. a multi-level top section with a lower level attached to said short perpendicular side section, a transition section connected to said lower level and to an upper level with said upper level attached to said long perpendicular side section;
   G. a connection means removably attached to said frame where said frame passes through said transition section so that said frame and said containment means are securely joined;
   H. a strength member attached to the forward edge of said front end connecting said upper level and said lower level of said multi-level top section;
   I. a removably, attachable cutting collector for collecting cuttings with an open end secured over said back end of said containment means and a closeable end removably attached to and supported from said frame; and
   J. raised retention rails attached to said back end of said containment means so that a means for receiving and retaining said cutting collector is provided and so that said back end is stengthened.

2. The cuttings collector of claim 1 wherein said removably attachable cutting collector further comprises an elastic drawstring means located at the front of said open end and which, when stretched over said raised retention rails and released, closes around and is retained by said retention rails.

3. A hand-held wild seed reaper comprising:
   A. a frame;
   B. a motor mounted on said frame;
   C. a cutting means mounted on the opposite end of said frame from said motor;
   D. a containment means attached around said cutting means open at a front end and a back end;
   E. a removably, attachable cutting collector for collecting cuttings with an open end secured over said back end of said containment means and a closeable end, so that said closeable end may be opened for dumping collected cuttings without detaching said cutting collector from said containment means, removably attached to and supported from said frame;
   F. a flat bottom section connected on one side to a short perpendicular side section and on the other side to a long perpendicular side section;
   G. a multi-level top section with a lower level attached to said short perpendicular side section, a transition section connected to said lower level and to an upper level with said upper level attached to said long perpendicular side section;
H. connection means removably attached to said frame where said frame passes through said transition section so that said frame and said containment means are securely joined;
I. a strength member attached to the forward edge of said front end connecting said upper level and said lower level of said multi-level top section;
J. raised retention rails attached to said back end of said containment means so that a means for receiving and retaining a cutting collector; and
K. an elastic drawstring means located at the front of said open end which, when stretched over said raised retention rails and released, said open end closes around and is retained by said retention rails.

4. A method for reaping wild seeds comprising the steps of:
A. providing a frame;
B. mounting a motor on said frame;
C. mounting a cutting means on the opposite end of said frame from said motor;
D. attaching a containment means around said cutting means open at a front end and a back end;
E. attaching a removable cutting collector for collecting cuttings with an open end secured over said back end of said containment means and a closeable end, so that said closeable end may be opened for dumping collected cuttings without detaching said cutting collector from said containment means, removably attached to and supported from said frame;
F. connecting on side of a flat bottom section to a short perpendicular side section and on the other side to along perpendicular side section;
G. attaching a multi-view top section with a lower level to said short perpendicular side section, connecting a transition section to said lower level and to an upper level with said upper level also attached to said long perpendicular side section;
H. removably attaching a connection means to said frame where said frame passes through said transition section so that said frame and said containment means are securely joined;
I. attaching a strength member to the forward edge of said front end connecting said upper level and said lower level of said multi-level top section;
J. attaching raised retention rails to said back end of said containment means so that a means for receiving and retaining said cutting collector is provided; and
K. attaching an elastic drawstring means to the front of said open end of said cutting collector and stretching said drawstring means over said raised retention rails so that, when released, said open end closes around and is retained by said retention rails.

* * * * *